United States Patent
Baek

(10) Patent No.: US 12,535,567 B2
(45) Date of Patent: Jan. 27, 2026

(54) LIDAR SYSTEM AND ITS CONTROL METHOD

(71) Applicant: HYUNDAI MOBIS CO., LTD., Seoul (KR)

(72) Inventor: Seung Wuk Baek, Siheung-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/372,878

(22) Filed: Sep. 26, 2023

(65) Prior Publication Data

US 2024/0019559 A1 Jan. 18, 2024

Related U.S. Application Data

(63) Continuation of application No. 17/032,424, filed on Sep. 25, 2020.

(30) Foreign Application Priority Data

Oct. 1, 2019 (KR) .......................... 10-2019-0121760
Oct. 2, 2019 (KR) .......................... 10-2019-0122528

(51) Int. Cl.
*G01S 7/48* (2006.01)
*G01S 7/497* (2006.01)
*G01S 17/14* (2020.01)
*G01S 17/931* (2020.01)

(52) U.S. Cl.
CPC ............ *G01S 7/497* (2013.01); *G01S 7/4804* (2013.01); *G01S 17/14* (2020.01); *G01S 17/931* (2020.01)

(58) Field of Classification Search
USPC ................................................ 356/4.01, 5.01
See application file for complete search history.

(56) References Cited

U.S. PATENT DOCUMENTS

| 10,520,602 B2 | 12/2019 | Villeneuve et al. |
| 10,557,940 B2 | 2/2020 | Eichenholz et al. |
| 10,591,600 B2 | 3/2020 | Villeneuve et al. |

(Continued)

FOREIGN PATENT DOCUMENTS

| CN | 104101866 A | 10/2014 |
| CN | 104333964 A * | 2/2015 |

(Continued)

OTHER PUBLICATIONS

Final Office Action issued in corresponding U.S. Appl. No. 17/032,424 dated Jun. 26, 2023.

(Continued)

*Primary Examiner* — James R Hulka
(74) *Attorney, Agent, or Firm* — MORGAN, LEWIS & BOCKIUS LLP

(57) ABSTRACT

A LIDAR system may include: a light generator configured to irradiate a laser to an object disposed in a blind section of the LIDAR system; a light receiver configured to sensing light reflected from the object; a receiver configured to receive a signal converted into an electric signal in the light receiver; a comparator configured to determine whether the signal is a voltage value which is equal to or greater than a predetermined reference; and a controller configured to control a pulse width of the laser irradiated to the object according to the determination.

11 Claims, 10 Drawing Sheets

(56) References Cited

U.S. PATENT DOCUMENTS

| | | | |
|---|---|---|---|
| 10,634,772 B2 | 4/2020 | Eckstein et al. | |
| 11,624,823 B2* | 4/2023 | Jachmann | G01S 7/497 356/4.01 |
| 2008/0150786 A1 | 6/2008 | Breed | |
| 2013/0113299 A1 | 5/2013 | Von Novak et al. | |
| 2013/0278076 A1 | 10/2013 | Proud | |
| 2014/0246924 A1 | 9/2014 | Proud | |
| 2017/0047847 A1 | 2/2017 | Imori | |
| 2017/0117970 A1 | 4/2017 | Wilkinson et al. | |
| 2017/0153319 A1 | 6/2017 | Villeneuve et al. | |
| 2017/0155225 A1 | 6/2017 | Villeneuve | |
| 2018/0164439 A1 | 6/2018 | Proz et al. | |
| 2018/0277030 A1 | 9/2018 | Wang et al. | |
| 2018/0364356 A1 | 12/2018 | Eichenholz et al. | |
| 2018/0372875 A1* | 12/2018 | Juelsgaard | G01S 17/931 |
| 2019/0162823 A1 | 5/2019 | Eckstein et al. | |
| 2020/0110176 A1* | 4/2020 | Jachmann | G01S 7/4868 |
| 2020/0114886 A1* | 4/2020 | Kim | G05D 1/0276 |
| 2020/0217965 A1 | 7/2020 | Calder et al. | |
| 2020/0280216 A1 | 9/2020 | Pei et al. | |
| 2020/0342748 A1 | 10/2020 | Tournier et al. | |
| 2020/0412993 A1 | 12/2020 | Kawazu et al. | |
| 2021/0096226 A1* | 4/2021 | Baek | G01S 17/14 |

FOREIGN PATENT DOCUMENTS

| | | |
|---|---|---|
| CN | 105891844 A | 8/2016 |
| CN | 107450081 A | 12/2017 |
| DE | 10 2018 124 837 B3 | 12/2019 |
| JP | 2001-141802 A | 5/2001 |
| JP | 3844956 B2 | 11/2006 |
| JP | 4785475 B2 | 10/2011 |
| JP | 2012-159330 A | 8/2012 |
| JP | 2017-173298 A | 9/2017 |
| JP | 2018-535438 A | 11/2018 |
| JP | 2019-095452 A | 6/2019 |
| WO | 2019/171839 A1 | 9/2019 |

OTHER PUBLICATIONS

Office Action issued in corresponding U.S. Appl. No. 17/032,424 dated Mar. 3, 2023.
Office Action issued in corresponding U.S. Appl. No. 17/032,424 dated Nov. 27, 2023.
Office Action issued in corresponding Chinese Patent Application No. 202011043123.5 dated Jul. 1, 2023, with English translation.
Office Action issued in corresponding Chinese Patent Application No. 202011043123.5 dated Mar. 16, 2024, with English translation.
Office Action issued in corresponding U.S. Appl. No. 17/032,424 dated Mar. 28, 2024.
Office Action issued in corresponding German Application No. 102020125270.6 dated Nov. 14, 2024, with English translation.
Office Action issued in corresponding U.S. Appl. No. 17/032,424 dated Jul. 3, 2025.

* cited by examiner

LIDAR SYSTEM AND ITS CONTROL METHOD

CROSS-REFERENCE TO RELATED APPLICATIONS

This application is the continuation application of U.S. patent application Ser. No. 17/032,424 filed on Sep. 25, 2020, which claims priority to and the benefit of Korean Patent Application No. 10-2019-0121760 filed on Oct. 1, 2019, and Korean Patent Application No. 10-2019-0122528 filed on Oct. 2, 2019, the entire contents of which are incorporated herein by reference.

TECHNICAL FIELD

The present disclosure relates to a LIDAR system and its control method, and particularly, to a LIDAR system and its control method which verify a malfunction of the LIDAR system by using a pulse modulation signal.

BACKGROUND

Light detection and ranging (LIDAR) represents measuring physical properties including a distance and concentration, a speed, a shape, and the like of an object to be measured from radiation of a laser up to a return time of a scattered or reflected laser and an intensity of the laser, a change in frequency, a change in polarization state, etc.

In the related art, presented is a scheme that minimizes loss of mid-infrared laser light by using a modulation signal and performs long-range light transmission.

In respect to such a problem of the scheme of the related art, it cannot be known at which frequency light is actually transmitted when the light is transmitted by using the modulation signal, and since omnidirectional transmission is performed, light in other surrounding wavelength band area may also be received when the light is received and since the modulation signal is periodically input, inefficient power consumption may occur.

SUMMARY

The present disclosure provides a LIDAR system and its control method which verify a malfunction of the LIDAR system by using a pulse modulation signal.

The present disclosure provides a laser driver device having a de-emphasis function to automatically adjust a pulse signal for driving a laser diode according to channel characteristics.

An exemplary embodiment of the present disclosure provides a LIDAR system including: a light generation unit irradiating a laser to an object disposed in a blind section of the LIDAR system; a light reception unit sensing light reflected from the object; a receiver receiving a signal converted into an electric signal in the light reception unit; a comparator determining whether the signal transferred from the receiver is a voltage value which is equal to or more than a predetermined reference; and a controller controlling a pulse width of the laser irradiated to the object from the light generation unit according to the determination of the comparator.

The controller may control an output power of the light generation unit through pulse width modulation.

When the signal transferred from the receiver is a voltage value which is less than the predetermined reference, the comparator may transmit a flag to the controller.

The controller may increase the pulse width of the laser re-irradiated to the object in response to the flag.

Until the signal transferred from the receiver to the comparator is a voltage value which is equal to or more the predetermined reference, the comparator may transmit the flag to the controller.

The controller may include an output unit outputting a pulse signal toward an internal communication channel, a pulse comparison unit comparing the pulse signal passing through the communication channel with a predetermined reference voltage, a determination unit determining whether the pulse signal is attenuated according to a comparison result of the pulse comparison unit, and a de-emphasis unit determining whether the pulse signal is modulated according to the determination result of the determination unit.

When it is determined that the pulse signal 1s attenuated according to the determination result, the de-emphasis unit may perform amplitude modulation for a rising edge of the pulse signal.

The pulse comparison unit may output a comparison result of a high level when the pulse signal is less than the reference voltage, and output a comparison result of a low level when the pulse signal is equal to or more than the reference voltage.

The determination unit may determine that the pulse signal is attenuated when receiving the comparison result of the high level from the pulse comparison unit, determine that the pulse signal is in a normal state when receiving the comparison result of the low level from the pulse comparison unit, and turn on a function of the de-emphasis unit when it is determined that the pulse signal is attenuated.

The de-emphasis unit may include a de-emphasis circuit connected to an output terminal of the output unit, a NOR gate transmitting an enable signal for turning on the function of the de-emphasis circuit when it is determined that the pulse signal is attenuated according to the determination result, and a delay control connected to at least one input terminal of the NOR gate to delay and transmit input data input into the determination unit.

The de-emphasis circuit may perform pulse width modulation of the pulse signal.

Another exemplary embodiment of the present disclosure provides a control method using a LIDAR system including: irradiating a laser to an object disposed in a blind section of the LIDAR system; receiving a signal reflected from the object; determining whether the received signal is a voltage value which is equal to or more than a predetermined reference; and controlling a pulse width of the laser irradiated to the object according to the determination of the voltage value of the signal.

The control method may further include transmitting a flag when the received signal is a voltage value which is less than a predetermined reference.

The control method may further include increasing the pulse width of the laser re-irradiated to the object in response to the flag.

The control method may further transmit the flag until a signal re-irradiated to and reflected on the object becomes a voltage value which is equal to or more than a predetermined reference.

According to an exemplary embodiment of the present disclosure, in a LIDAR system and its control method, a pulse signal of a laser input into a light generation unit is modulated in a blind section of a LIDAR system and whether the LIDAR system malfunctions can be more precisely measured through the resulting feedback control.

According to another exemplary embodiment of the present disclosure, in a laser driver device having an automatic adjustment de-emphasis function, a pulse signal for driving a laser diode is automatically adjusted according to channel characteristics to sense and improve signal attenuation of the pulse signal output from an output buffer.

By using amplitude modulation which is a main function of de-emphasis and a pulse width adjustment function of de-emphasis, the pulse signal can be automatically adjusted according to frequency characteristics of a channel.

When the LIDAR system is booted up, reliability for a laser light signal for sensing a target object and measuring a distance is secured at an initial time.

The foregoing summary is illustrative only and is not intended to be in any way limiting. In addition to the illustrative aspects, embodiments, and features described above, further aspects, embodiments, and features will become apparent by reference to the drawings and the following detailed description.

DRAWINGS

Figure 1:
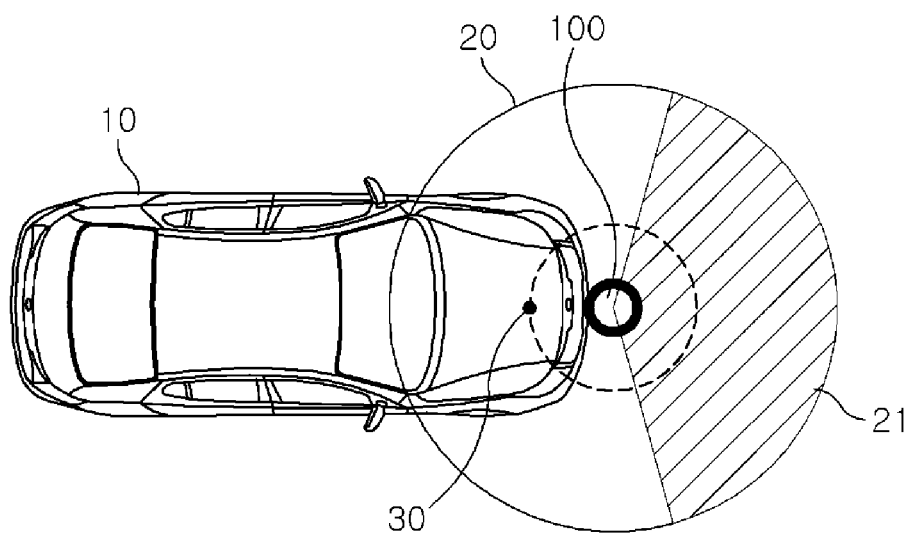
FIG. 1 is a diagram exemplarily illustrating a vehicle with a LIDAR system in one form of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, a preferred embodiment of the present disclosure will be described in detail with reference to the accompanying drawings. First, when reference numerals refer to components of each drawing, it is to be noted that although the same components are illustrated in different drawings, the same components are denoted by the same reference numerals as possible. Further, in describing the present disclosure, a detailed description of known related configurations and functions may be omitted to avoid unnecessarily obscuring the subject matter of the present disclosure. Further, hereinafter, the preferred embodiment of the present disclosure will be described, but the technical spirit of the present disclosure is not limited thereto or restricted thereby and the embodiments can be modified and variously executed by those skilled in the art.

FIG. 1 is a diagram exemplarily illustrating a vehicle with a light detection and ranging (LIDAR) system in some forms of the present disclosure.

Referring to FIG. 1, a vehicle 10 with a LIDAR system 100 in some forms of the present disclosure is illustrated. A LIDAR sensor may be used for collecting a distance to a target, a direction, a speed, a temperature, a material distribution and concentration characteristics or 3D image information by irradiating a laser beam to the target and receiving light reflected on the target.

The known LIDAR sensor may be classified into a time-of-flight (TOF) scheme and a phase-shift scheme according to a modulation method of a laser signal.

In this case, the TOF scheme is a scheme in which a time when reflected pulse signals from objects within a measurement range reach a receiver is measured by emitting the pulse signal by a laser to measure the distance up to the object and the phase-shift scheme is a scheme in which the laser beam continuously modulated with a specific frequency is emitted and a phase change amount of a signal reflected on and returned from the object within the measurement range is measured to calculate the time and the distance.

Meanwhile, the modulation method of the laser signal in the present disclosure is not limited to any one of the TOF or phase-shift scheme.

In some forms of the present disclosure, the LIDAR system 100 may be mounted on a bonnet or a bumper of the vehicle 10 as illustrated in FIG. 1. Further, the LIDAR system 100 may measure a target (not illustrated) in a LIDAR measurement section 21 positioned in front of a progress direction of the vehicle 10 according to rotation of a driving unit 101 illustrated in FIG. 2. In this case, the LIDAR measurement section 21 may be Field of View (FOV) indicating a signal measurement angle of the receiver of the LIDAR system 100. Further, since the LIDAR system 100 is mounted on the bonnet or bumper (a front part of the vehicle 10) of the vehicle 10, the LIDAR measurement section 21 for measuring the target is not 360 degrees but may be set to be limited.

Meanwhile, when the LIDAR system 100 is operated, it is necessary to check whether a light generation unit and a light reception unit properly operate.

In this case, the light generation unit may be a laser diode (LD) generating a laser by using a semiconductor junction as an active medium and the light reception unit may be a photo diode (PD) which is one type of an optical sensor converting light energy into electric energy.

If it is verified whether the LIDAR system 100 malfunctions in the LIDAR measurement section 21 measured by the LIDAR system 100, an optical signal sensed by the light reception unit is converted into an electric signal and it may not be checked whether a reason why the converted signal is not sensed by the receiver is that a transmission signal of the light generation unit is weak or that a signal is not sensed because there is no reflected signal as there is no target in front of a progress direction of the vehicle 10, and as a result, it may not be checked whether the light generation unit and the light reception unit properly operate.

In this case, an object 30 is disposed in a blind section 20 which is a section other than the LIDAR measurement section 21 to verify the malfunction of the light generation unit and the light reception unit and determine whether the object 30 is sensed. The object 30 may be fixedly mounted on an inside of the vehicle 10, specifically, a back side of the bonnet or bumper of the vehicle 10.

Figure 2:
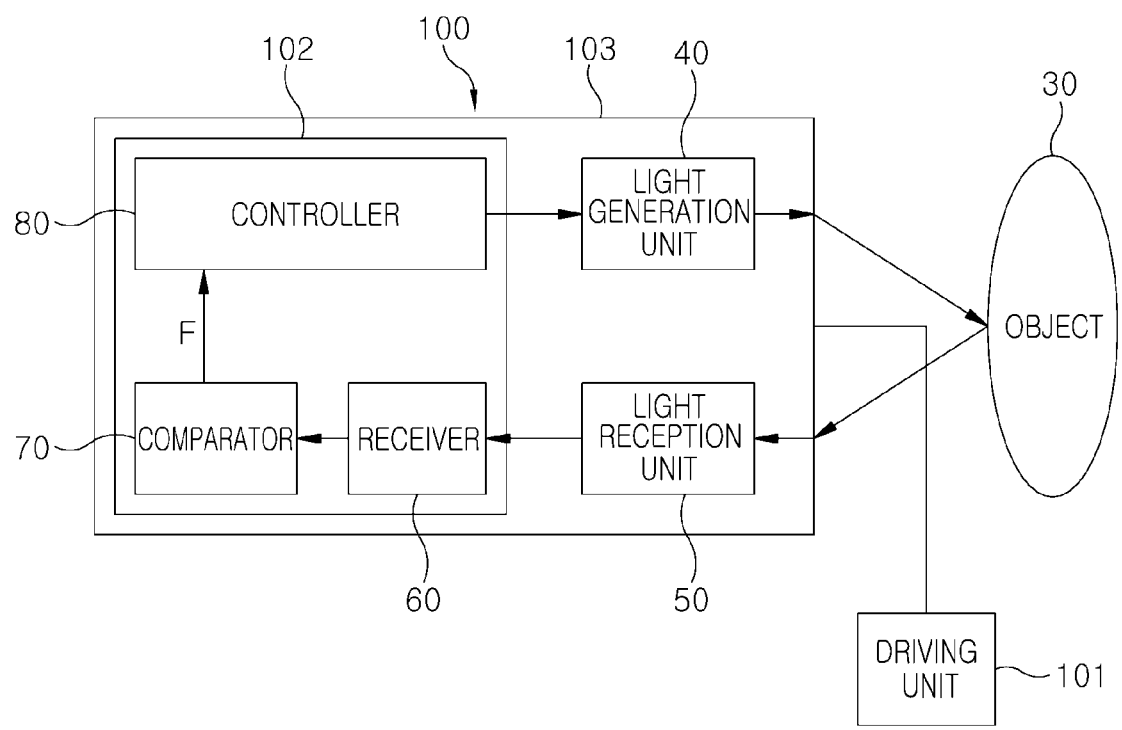
FIG. 2 is a diagram schematically illustrating a configuration and an operation of a LIDAR system in one form of the present disclosure.
Figure 3:
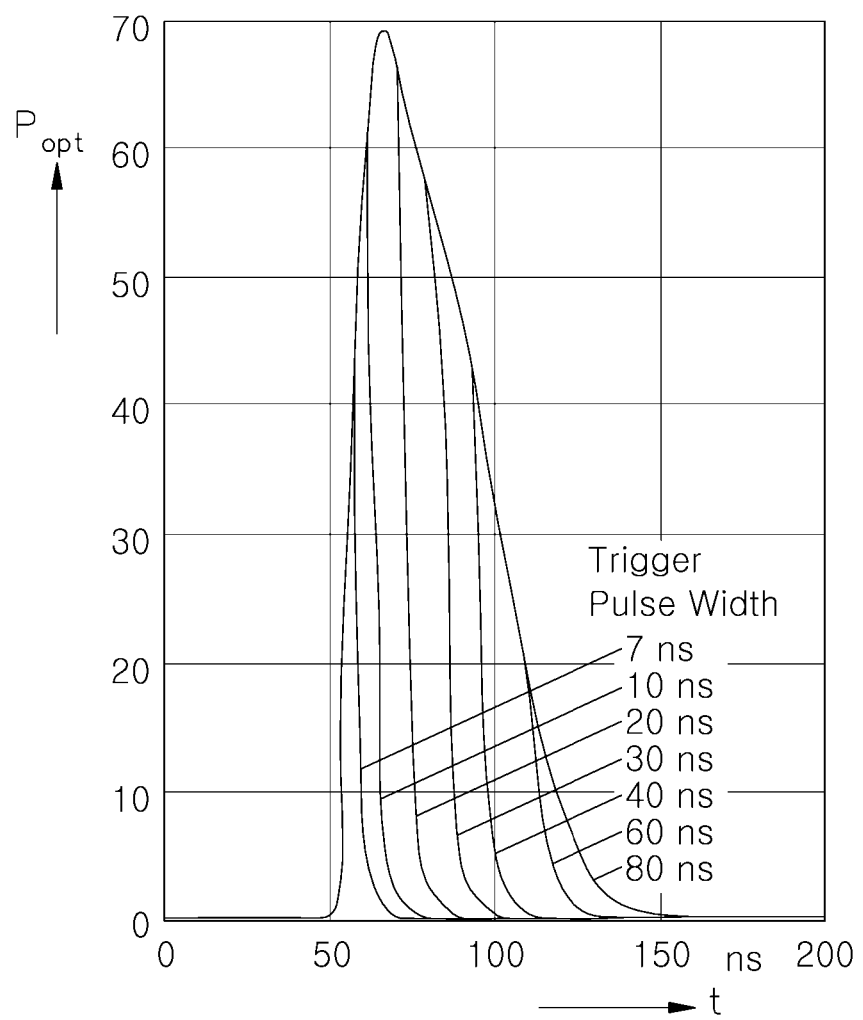
FIG. 3 is a diagram exemplarily illustrating an output power change of a light generation unit depending on a pulse width control of a controller.

FIG. 2 is a diagram schematically illustrating a configuration and an operation of a LIDAR system in some forms of the present disclosure and FIG. 3 is a diagram exemplarily illustrating an output power change of a light generation unit depending on a pulse width control of a controller.

Referring to FIG. 2, the LIDAR system 100 in some forms of the present disclosure is constituted by a driving unit 101 driving the LIDAR system 100, and an electronic board 103 including a light generation unit 40, a light reception unit 50, and an electronic chip 102.

More specifically, the light generation unit 40 may be a laser light source of a specific wavelength area (e.g., a wavelength area of 250 nm to 11 μm) that may irradiate a laser to the object 30 disposed in the blind section 20 of the LIDAR system 100. In addition, the light reception unit 50 may sense the light reflected from the target positioned in the LIDAR measurement section 21 or the object 30 positioned in the blind section 20.

In this case, as illustrated in FIG. 2, the electronic chip 102 includes a receiver 60 receiving a signal converted into an electric signal from the light reception unit 50, a comparator 70 comparing the signal transferred from the receiver 60 with a reference signal value, and a controller 80 controlling a pulse width of the laser irradiated from the light generation unit 40.

The driving unit 101 may be a rotation motor which is rotatable at 360 degrees, and the LIDAR system 100 may irradiate the laser to the target positioned in the LIDAR measurement section 21 or the object 30 positioned in the blind section 20 and receive an optical signal reflected from the target or object 30 with rotation of the driving unit 101.

In this case, when the driving unit 101 rotates the LIDAR measurement section 21, the LIDAR system 100 normally measures a distance up to the target positioned in front of the progress direction of the vehicle 10, a direction, a speed, etc.

When the driving unit 101 rotates the blind section 20, the driving unit 101 irradiates the laser to the object 30 in the blind section 20 from the light generation unit 40 and determines whether the laser signal reflected from the object 30 is accurately detected through the light reception unit 50 and the receiver 60.

Meanwhile, a laser output power of the light generation unit 40 may vary depending on a pulse width input into the light generation unit 40 as illustrated in FIG. 3. In this case, as the pulse width input into the light generation unit 40 increases, the output power of the laser irradiated to the object 30 from the light generation unit 40 increases, and as a result, a distance to measure the object 30 may vary.

If the output power of the light generation unit 40 is lower than a reference signal value when the LIDAR system 100 measures the object 30 in the blind section 20, there may be a case where a signal of a voltage value which is less than a predetermined reference is reflected from the object 30 and transferred to the receiver 60 through the light reception unit 50.

In this case, the comparator 70 may determine whether the laser signal reflected from the object 30 and transferred from the receiver 60 to the comparator 70 is a voltage value of a predetermined reference or more. When the comparator 70 determines that the laser signal transferred from the receiver 60 is a voltage value which is less than the predetermined reference, the comparator 70 may transmit a flag (F) signal to the controller 80.

When the controller 80 receives the flag (F) signal transmitted from the comparator 70, the controller 80 may control the output power of the light generation unit 40 by performing pulse width modulation in response thereto.

Specifically, the controller 80 may increase the laser output power of the light generation unit 40 by increasing the pulse width of the laser re-irradiated to the object 30 from the light generation unit 40 as illustrated in FIG. 3 in response to the flag (F) signal transmitted from the comparator 70.

After the process, the laser of which output power increases according to the pulse width modulation of the controller 80 may be re-irradiated to the object 30 and the laser signal reflected from the object 30 may be transferred to the comparator 70 through the light reception unit 50 and the receiver 60.

In this case, when the comparator 70 determines that the signal transferred through the receiver 60 is still a voltage value which is less than the predetermined reference, the comparator 70 may transmit a flag (F) to the controller 80 again. As such, the comparator 70 may perform a feedback control by a scheme of transmitting the flag F to the controller 80 until the signal transferred to the comparator 70 from the receiver 60 becomes a voltage value which is equal to or more than a predetermined reference.

When the signal transferred to the comparator 70 satisfies the voltage value which is equal to or more than the predetermined reference by repeating the feedback control, the comparator 70 may not transmit the flag F to the controller 80 any longer and determine that the LIDAR system 100 normally operates. Meanwhile, the output power of the light generation unit 40 may be adjusted by a pulse width control of the controller 80 under a condition that does not violate eye-safety.

Figure 4:
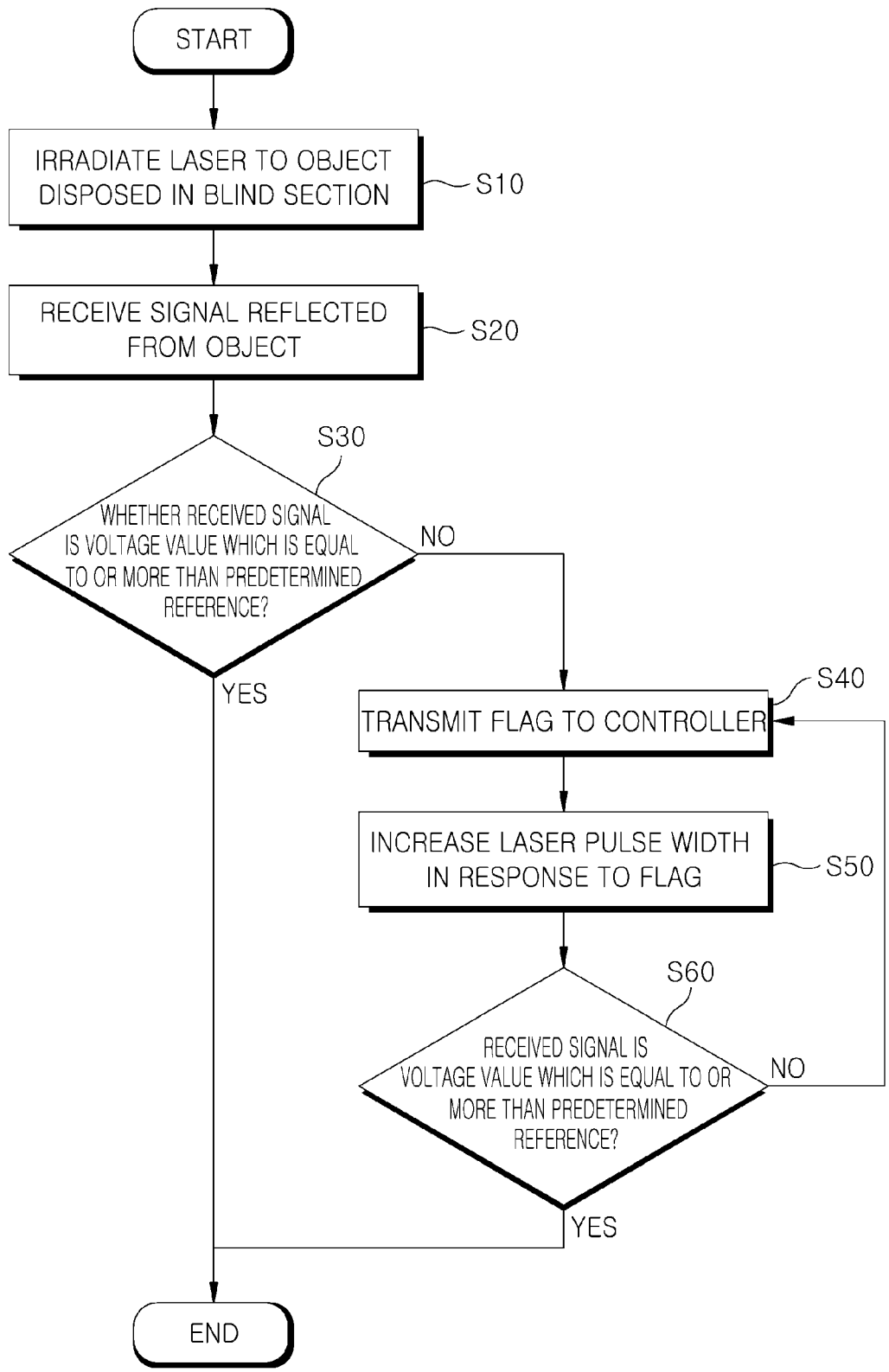
FIG. 4 is a flowchart illustrating a control method of a LIDAR system in one form of the present disclosure.

Hereinafter, referring to FIG. 4, a control method of the LIDAR system 100 based on a configuration of the LIDAR system 100 described with reference to FIG. 2 will be described. FIG. 4 is a flowchart illustrating a control method of a LIDAR system 100 in some forms of the present disclosure.

First, the laser emitted from the light generation unit 40 may be irradiated to the object 30 disposed in the blind section 20 of the LIDAR system 100 illustrated in FIGS. 1 and 2 (step S10).

Thereafter, the light reception unit 50 may sense the laser signal reflected from the object 30 and the light reception unit 50 may convert the sensed laser signal into the electric signal and receive the electric signal through the receiver 60 (step S20).

In this case, the comparator 70 may determine whether the signal received through the receiver 60 is a voltage value which is equal to or more than a predetermined criterion (step S30).

When it is determined that the signal reflected from the object 30 and received through the receiver 60 is the voltage value which is equal to or more than the predetermined reference, it may be determined that the LIDAR system 100 normally operates as illustrated in FIG. 4.

However, in step S30 above, when it is determined that the signal received through the receiver 60 is a voltage value which is less than the predetermined reference, the flag (F) may be transmitted to the controller 80 (step S40). In response to the flag F transmitted to the controller 80 in step S40 above, the pulse width of the laser re-irradiated to the object 30 may increase (step S50).

In this case, the laser of which output power increases according to the pulse width modulation of the controller 80 may be re-irradiated to the object 30 and the laser signal reflected from the object 30 may be transferred to the comparator 70 through the light reception unit 50 and the receiver 60.

In this case, the comparator 70 may determine whether the signal received through the receiver 60 is a voltage value which is equal to or more than a predetermined criterion again (step S60).

When it is determined that the signal re-irradiated to and reflected on the object 30 and then received through the receiver 60 is the voltage value which is equal to or more than the predetermined reference, steps S40 and S50 above may be terminated and it may be determined that the LIDAR system 100 normally operates.

However, when the comparator 70 determines that the signal transferred through the receiver 60 is still a voltage value which is less than the predetermined reference, a flag (F) may be transmitted to the controller 80 again (steps S40 and S50 are repeated).

As such, the comparator 70 may perform a feedback control by a scheme of transmitting the flag F to the controller 80 until the signal transferred to the comparator 70 from the receiver 60 becomes a voltage value which is equal to or more than a predetermined reference.

When the signal transferred to the comparator 70 satisfies the voltage value which is equal to or more than the predetermined reference by repeating the feedback control, the comparator 70 may not transmit the flag F to the controller 80 any longer and may determine that the LIDAR system 100 normally operates.

Meanwhile, in the exemplary embodiment of FIGS. 2 to 4 of the present disclosure, a control scheme of increasing the output power of the laser by controlling the pulse width of the light generation unit 40 is exemplarily described, but contrary to this, a scheme may also be available in which when the laser signal reflected from the object 30 is converted into the electric signal in the light reception unit 50 by changing a magnitude of a bias voltage applied to the light reception unit 50, the feedback control is performed by a scheme of amplifying the magnitude of the converted electric signal.

Alternatively, it is possible even to perform the feedback control by a scheme of increasing a signal amplification rate of the signal received by the receiver 60.

Hereinafter, another scheme of controlling the output power of the light generation unit 40 will be described. A controller 102 in some forms of the present disclosure corresponds to a laser driver device 200 in FIGS. 5 to 10.

Figure 5:
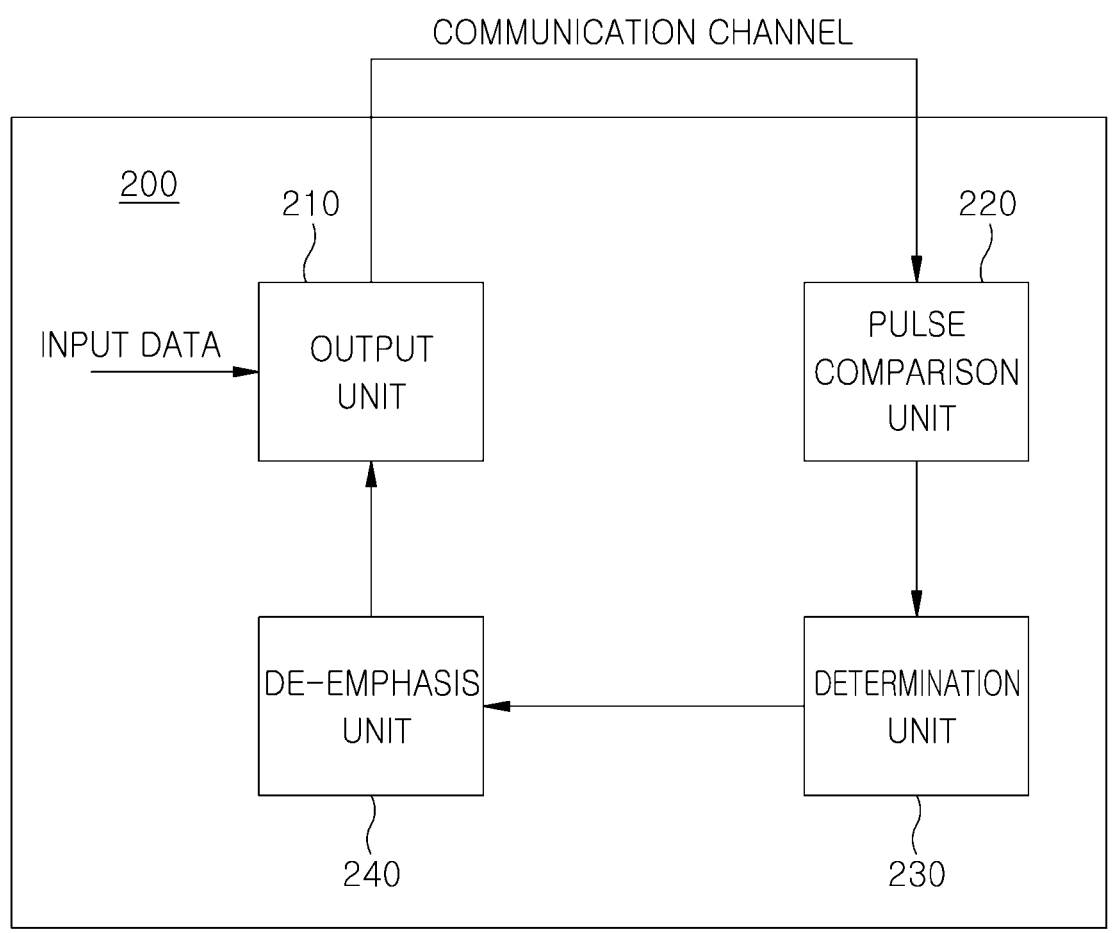
FIG. 5 is a block diagram of a laser driver device with an automatic adjustment de-emphasis function in one form of the present disclosure.
Figure 6:
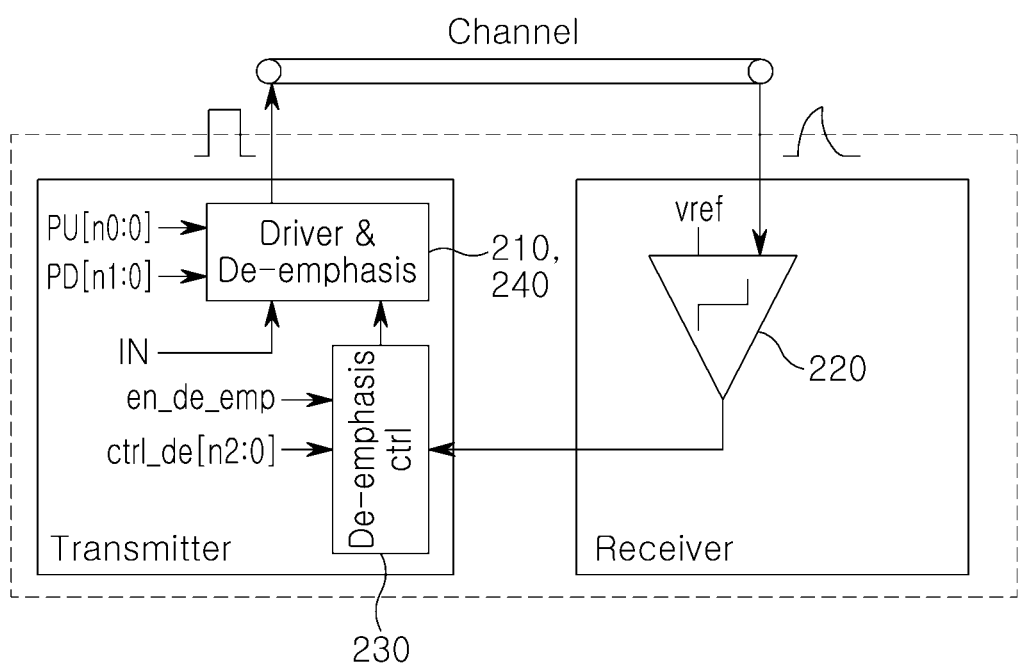
FIG. 6 is a schematic conceptual diagram of a laser driver device with an automatic adjustment de-emphasis function in one form of the present disclosure.

FIG. 5 is a block diagram of a laser driver device with an automatic adjustment de-emphasis function in some forms of the present disclosure. FIG. 6 is a schematic conceptual diagram of a laser driver device with an automatic adjustment de-emphasis function in some forms of the present disclosure.

Referring to FIGS. 5 and 6, a laser driver device 200 with an automatic adjustment de-emphasis function in some forms of the present disclosure includes an output unit 210, a pulse comparison unit 220, a determination unit 230, and a de-emphasis unit 240.

The output unit 210 may be provided in a transmitter emitting a laser light. The output unit 210 may receive input data IN. The output unit 210 may output an output signal in response to the input data IN. Here, the input data IN and the output signal may be laser pulse signals used for distance measurement from a target object in the LIDAR system.

The output unit 210 may receive a pull-up signal PU[n0:0] for pulling up the input data IN and a pull-down signal PD[n1:0] for pulling down the input data IN.

The output unit 210 pulls-up and pulls down the output signal to output the output signal toward a communication channel. Here, the communication channel may be an internal communication channel of the LIDAR system with the laser driver device 200. In general, the output unit 210 transmits the output signal to a laser diode (not illustrated) emitting the laser light in the air. In this case, the output unit 210 transmits the output signal to the laser diode (not illustrated) and transfers the output signal to a time to digital converter (TDC) through the communication channel to notify an output time of the output signal. The pulse comparison unit 220 may receive the output signal of the output unit 210, which passes through the communication channel. The pulse comparison unit 220 may be provided in a receiver with a photodiode (not illustrated) receiving the laser light but is not limited thereto. The pulse comparison unit 220 may compare the output signal of the output unit 210 with a predetermined reference voltage vref. Here, the reference voltage vref may be appropriately set according to the need of a user or a use environment of the LIDAR system.

When a voltage level of the output signal of the output unit 210, which passes through the communication channel is less than the reference voltage, the pulse comparison unit 220 may output a comparison result of high level '1'. When the voltage level of the output signal of the output unit 210, which passes through the communication channel is equal to or more than the reference voltage, the pulse comparison unit 220 may output a comparison result of low leveL '0'.

The determination unit 230 may receive the comparison result of the pulse comparison unit 220. The determination unit 220 may determine whether the output signal of the output unit 210, which passes through the communication channel is attenuated according to the comparison result of the pulse comparison unit 220. When receiving the comparison result of high level '1' from the pulse comparison unit 220, the determination unit 230 may determine that the output signal of the output unit 210 is attenuated by characteristics of the communication channel.

When the determination unit 230 receives the comparison result of low level '0' from the pulse comparison unit 220, the determination unit 230 may determine that the output signal of the output unit 210 is in a normal state.

The determination unit 230 may be a kind of de-emphasis ctrl which turns on or off a function of the de-emphasis unit 240 by using the determination result.

The de-emphasis unit 240 may decide whether the output signal of the output unit 210 is modulated according to the determination result of the determination unit 230. When it is determined that the output signal of the output unit 210 is attenuated through the determination result of the determination unit 230, the de-emphasis unit 240 may perform amplitude modulation for a rising edge of the output signal of the output unit 210. Further, the de-emphasis unit 240 may perform pulse width modulation of the output signal of the output unit 210 for compensation of the attenuated signal.

The laser driver device 200 with the automatic adjustment de-emphasis function in some forms of the present disclosure configured as such may determine attenuation of the output signal by the communication channel and compensate the attenuated signal in advance. Further, in boot-up of the LIDAR system, reliability for the distance from the target object measured by using the output signal in an initial time is enhanced.

Hereinafter, a circuit configuration of the output unit 210, the de-emphasis unit 240, and the determination unit 230 will be described in brief.

Figure 7:
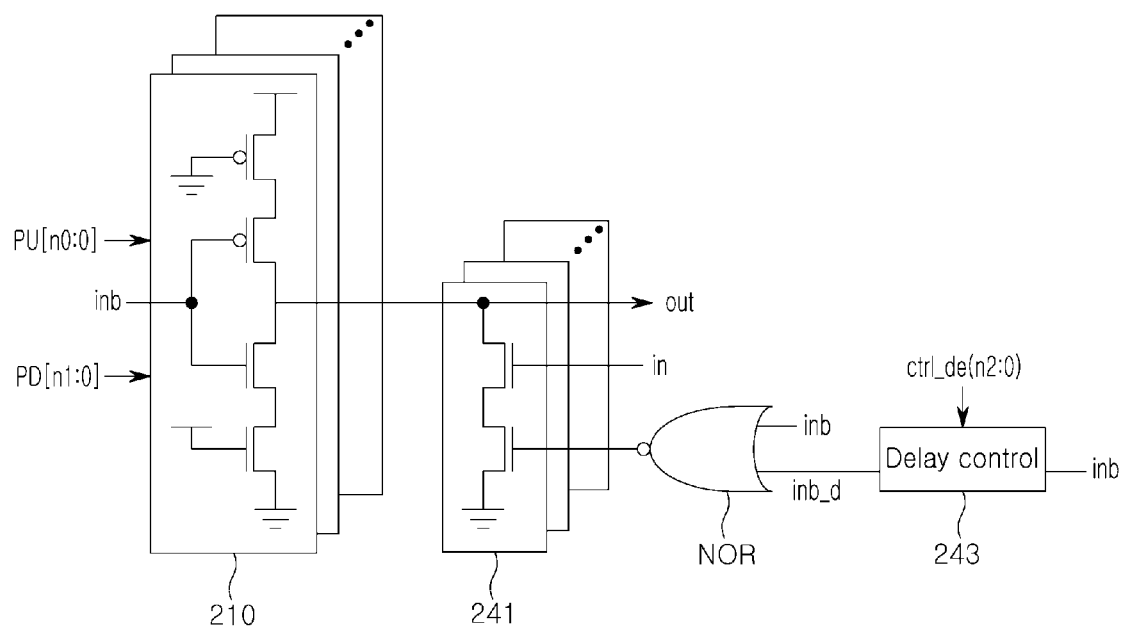
FIG. 7 is a diagram illustrating a schematic circuit configuration of a laser driver device with an automatic adjustment de-emphasis function in one form of the present disclosure.

FIG. 7 is a diagram illustrating a schematic circuit configuration of a laser driver device with an automatic adjustment de-emphasis function in some forms of the present disclosure.

Referring to FIG. 7, the output unit 210 may include a switching element in which input data inb is input into a gate terminal and a switching element in which the ground is connected to the gate terminal. The output unit 210 is not limited to the circuit configuration of FIG. 7. Here, the input data inb may be a pulse signal which has an opposite polarity to an input data in. The switching element may be MOSFET. The output unit 210 may output an output signal out in response to the input data inb.

The de-emphasis unit 240 may include a de-emphasis circuit 241 including a switching element in which a drain terminal is connected to an output terminal of the output unit 210 and the input data in is input into the gate terminal and a switching element in which the drain terminal is connected to a source terminal of the switching element and the output terminal of a NOR gate is connected to the gate terminal. The de-emphasis circuit 241 may modulate an amplitude of the output signal out of the output unit 210. The de-emphasis circuit 241 is not limited to a circuit of FIG. 7.

The de-emphasis unit 240 may include a NOR gate and the NOR gate may turn on the operation of the de-emphasis unit 240. In this case, the de-emphasis circuit 241 may perform pulse width modulation of the output signal out of the output unit 210.

In the NOR gate, the input data inb may be input into a first input terminal and delayed input data inb_d may be input into a second input terminal. The NOR gate outputs an output value of a high level when both the input data inb and the delayed input data inb_d are at a low level '0'. The NOR gate outputs the output value of the low level when any one of the input data inb and the delayed input data inb_d are at the high level '1'. The NOR gate outputs the output value (enable signal) of the high level to turn on the function of the de-emphasis unit 240.

The de-emphasis unit 240 may include a delay control 243 that delays and outputs the input data inb. The delay control 243 may receive a control delay signal ctrl_de (n2:0). The delay control 243 may delay the input data inb in response to the control delay signal ctrl_de (n2:0). Here, the control delay signal ctrl_de (n2:0) may be a control bit signal of at least 3. The delay control 243 delays the input data inb to enable the pulse width modulation for the signal of the de-emphasis circuit 241.

Figure 8:
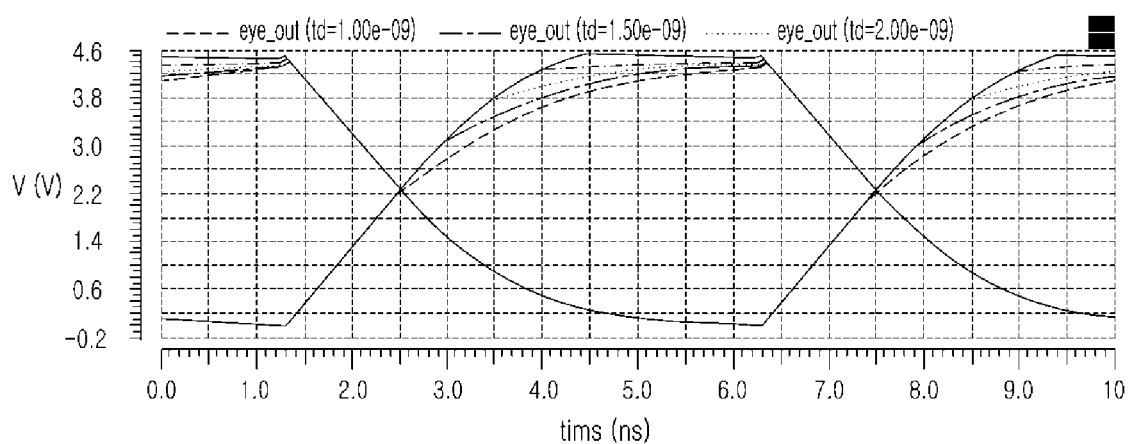
FIG. 8 is a diagram illustrating various examples of a pulse signal of an output unit, which is attenuated.

FIG. 8 is a diagram illustrating various examples of a pulse signal of an output unit 210, which is attenuated. Referring to FIG. 8, when signal attenuation of the pulse signal of the output unit 210 by the channel is sensed, the de-emphasis unit 240 may increase the amplitude based on the rising edge of the pulse signal.

In FIG. 8, in the case of pulse signal eye_out (td=1.00e−09), a pulse voltage of the rising edge at approximately 4.0 ns may be 3.6 V and may increase to approximately 4.4 V to 4.6 V by the de-emphasis unit 240. Further, in the case of pulse signal eye_out (td=1.50e−09), a pulse voltage of the rising edge at approximately 4.0 ns may be 3.8 V and may increase to approximately 4.4 V to 4.6 V by the de-emphasis unit 240. In addition, in the case of pulse signal eye_out (td=1.00e−09), a pulse voltage of the rising edge at approximately 4.0 ns may be 4.0 V and may increase to approximately 4.4 V to 4.6 V by the de-emphasis unit 240.

Figure 9:
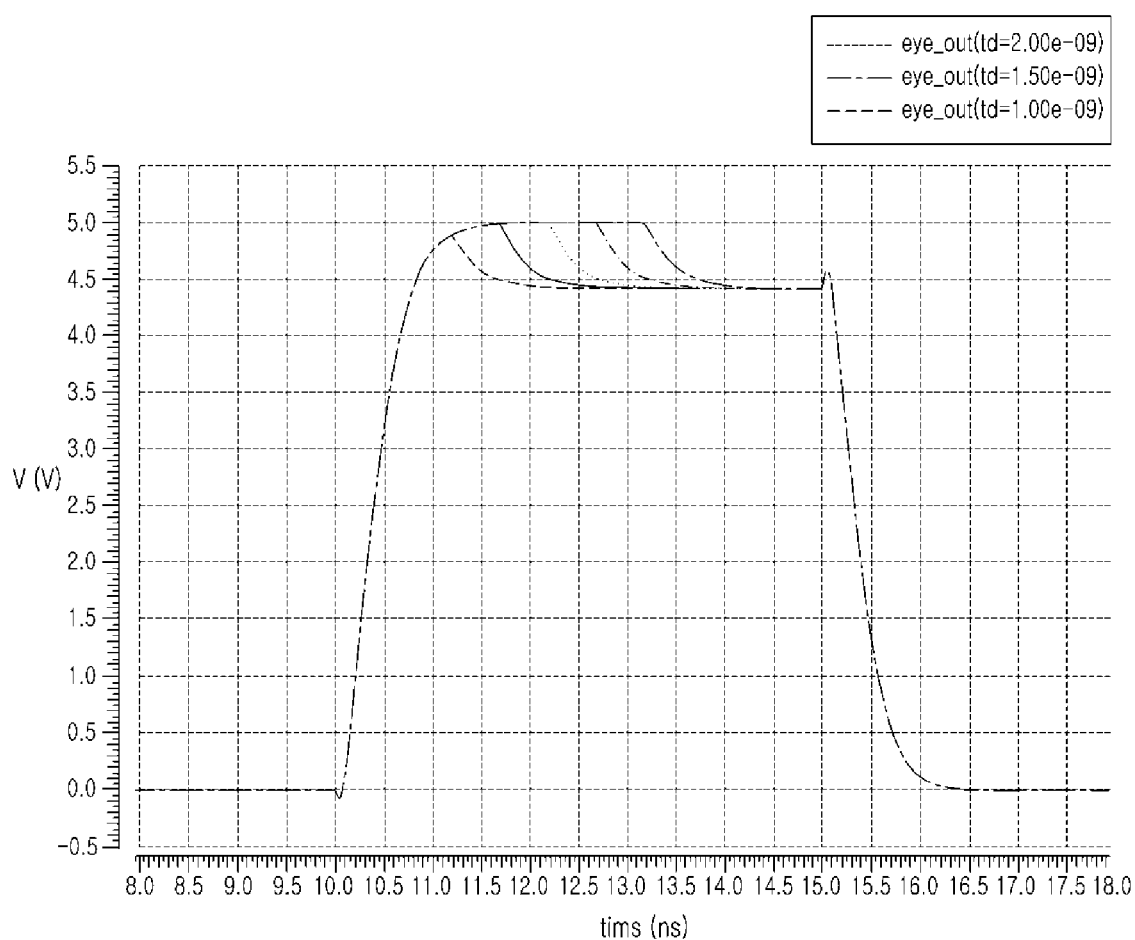
FIG. 9 is a diagram illustrating various examples of a pulse signal of an output unit, of which pulse width is adjusted.

FIG. 9 is a diagram illustrating various examples of a pulse signal of an output unit 210, of which pulse width is adjusted.

Referring to FIG. 9, pulse width modulated states of the pulse signal eye_out (td=1.00e−09), pulse signal eye_out (td=1.50e−09), and pulse signal eye_out (td=1.00e−09) described in FIG. 8 may be seen.

Figure 10:
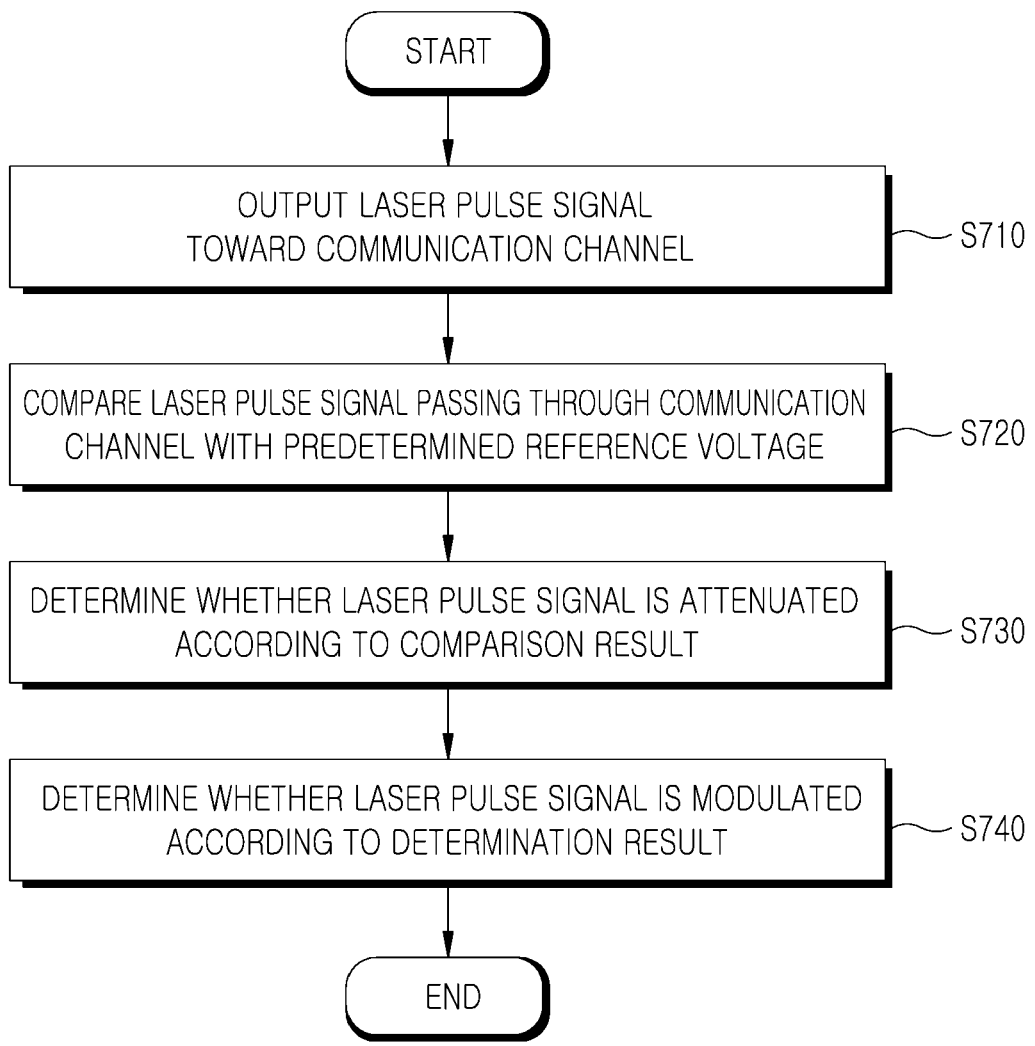
FIG. 10 is a flowchart of an operation method of a laser driver device with an automatic adjustment de-emphasis function in one form of the present disclosure.

FIG. 10 is a flowchart of an operation method of a laser driver device with an automatic adjustment de-emphasis function in some forms of the present disclosure.

Referring to FIGS. 5 and 10, an operation method of a laser driver device with an automatic adjustment de-emphasis function includes an output step (S710), a comparison step (S720), a determination step (S730), and a modulation step (S740).

In the output step (S710), the output unit 210 outputs the pulse signal toward the communication channel. The pulse signal may be a signal for driving the laser diode.

In the comparison step (S720), the pulse comparison unit 220 compares the pulse signal passing through the communication channel with a predetermined reference voltage. The pulse comparison unit 220 outputs the comparison result of the high level when the voltage of the pulse signal is less than the reference voltage and outputs the comparison result of the low level when the voltage of the pulse signal is equal to or more than the reference voltage.

In the determination step (S730), the determination unit 230 determines whether the pulse signal is attenuated according to the comparison result. When the determination unit 230 receives the comparison result of the high level from the pulse comparison unit 220, the determination unit 230 determines that the pulse signal is attenuated. When the determination unit 230 receives the comparison result of the low level from the pulse comparison unit 220, the determination unit 230 determines that the pulse signal is in the normal state.

In the modulation step (S740), the de-emphasis unit 240 determines whether the pulse signal is modulated according to the comparison result. The de-emphasis unit 240 performs signal modulation of the pulse signal when it is determined that the pulse signal is attenuated. Herein, the signal modulation includes amplitude modulation and pulse width modulation.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A laser driver device with an automatically adjustable de-emphasis function comprising:
   a transmitter configured to emit a laser light, the transmitter including: an output unit configured to output a pulse signal toward a communication channel;
   a receiver configured to receive the laser light via the communication channel, the communication channel being an internal communication channel which is used to transmit the pulse signal to a time to digital converter (TDC) in the receiver, the receiver including:
   a comparison unit configured to compare the pulse signal passing through the communication channel with a preset reference voltage;
   a determination unit configured to determine whether the pulse signal is attenuated by characteristics of the communication channel according to the comparison result of the comparison unit;
   a de-emphasis unit configured to determine whether to modulate the pulse signal according to the determination result of the determination unit, wherein the de-emphasis unit includes:
   a de-emphasis circuit electrically connected to an output terminal of the output unit to output the pulse signal and configured to modulate an amplitude of the pulse signal;
   a NOR gate including at least two input terminal configured to receive a first input signal and a second input signal delayed relative to the first input signal and to output an enable signal to activate the de-emphasis circuit to perform pulse width modulation of the pulse signal, wherein the enable signal is at a first level when the first input signal and second input signal are at a second level which is different from the first level and
   a delay control unit connected to at least one input terminal of the NOR gate and configured to delay and transmit an input data to the NOR gate, an amount of delay controlled by a control delay signal, wherein the delayed input data and a non-delayed input data are input to the NOR gate as the first input signal and the second input signal; and
   a driving unit configured to rotate and control a Lidar system such that the Lidar system irradiates the laser light to a target object located in a radar measurement area or an object located in a blind area and the Lidar system receives an optical signal reflected from the target object or the object according to a rotation of the driving unit, the blind area being an area other than the radar measurement area, wherein the driving unit includes a motor rotatable at 360 degrees.

2. The laser driver device of claim 1, wherein the de-emphasis unit is configured to perform signal modulation of the pulse signal when it is determined that the pulse signal is attenuated according to the determination result.

3. The laser driver device of claim 2, wherein the de-emphasis unit is configured to perform amplitude modulation on a rising edge of the pulse signal.

4. The laser driver device of claim 1, wherein the comparison unit is configured to output a high-level comparison result when the pulse signal is less than the preset reference voltage, and to output a low-level comparison result when pulse signal is higher than the preset reference voltage.

5. The laser driver device of claim 4, wherein the determination unit is configured to determine that the pulse signal is attenuated upon receiving the high-level comparison result from the comparison unit, and to determine that the pulse signal is in a normal state upon receiving the low-level comparison result.

6. The laser driver device of claim 5, wherein the determination unit is configured to turn-on a function of the de-emphasis unit when it is determined that the pulse signal is attenuated.

7. The laser driver device of claim 1, wherein the pulse signal is a laser signal.

8. A method of operating a laser driver device having an automatically adjustable de-emphasis function comprising:
   outputting, by a transmitter, a pulse signal toward a communication channel, wherein the communication channel is an internal communication channel which is used to transmit the pulse signal to a time to digital converter (TDC) in a receiver;
   comparing, by the receiver, the pulse signal passing through the communication channel with a preset reference voltage;
   determining, by the receiver, whether the pulse signal is attenuated by characteristics of the communication channel according to the comparison result;
   determining, by the receiver, whether to modulate the pulse signal according to the determination result, the receiver includes:
      a de-emphasis circuit electrically connected to an output terminal of an output unit of the receiver configured to output the pulse signal, the de-emphasis circuit configured to modulate an amplitude of the pulse signal;
      a NOR gate including at least two input terminal configured to receive a first input signal and a second input signal delayed relative to the first input signal and to output an enable signal to activate the de-emphasis circuit to perform pulse width modulation of the pulse signal, wherein the enable signal is at a first level when the first input signal and second input signal are at a second level which is different from the first level; and
      a delay control unit connected to at least one input terminal of the NOR gate and configured to delay and transmit an input data to the NOR gate, an amount of delay controlled by a control delay signal, wherein the delayed input data and a non-delayed input data are input to the NOR gate as the first input signal and the second input signal; and
   rotating and controlling a Lidar system, by a driving unit, such that the Lidar system irradiates a laser light to a target object located in a radar measurement area or an object located in a blind area and the Lidar system receives an optical signal reflected from the target object or the object according to a rotation of the driving unit, the blind area being an area other than the radar measurement area, wherein the driving unit includes a motor rotatable at 360 degrees.

9. The method of claim 8, wherein the determining whether to modulate the pulse signal further comprising:
   modulating an amplitude of the pulse signal when it is determined that the pulse signal is attenuated according to the determination result.

10. The method of claim 8, wherein the comparing the pulse signal further comprising:
   outputting a high-level comparison result when the pulse signal is less than the preset reference voltage, and
   outputting a low-level comparison result when pulse signal is higher than the preset reference voltage.

11. The laser driver device of claim 10, wherein the determining whether the pulse signal is attenuated further comprising:
   determining that the pulse signal is attenuated according to the high-level comparison result, and
   determining that the pulse signal is in a normal state according to the low-level comparison result.

\* \* \* \* \*